3,461,093
**INTERPOLYMERS OF CASTOR OIL
AND VINYL MONOMERS**
William Thomas Walton and Edward Julius Holzrichter, Chicago, Ill., assignors to PRA Laboratories, Inc. (Paint Research Associates), Chicago, Ill., a corporation of Illinois
No Drawing. Filed Nov. 22, 1965, Ser. No. 509,162
Int. Cl. C08f 15/40, 21/04, 37/16
U.S. Cl. 260—21                                7 Claims

ABSTRACT OF THE DISCLOSURE

An interpolymer formed of a vinyl monomer having functional hydroxyl or carboxyl groups, a hard vinyl monomer, such as styrene, and castor oil. The castor oil is interpolymerized with the other ingredients. The functional vinyl monomer is added in amounts sufficient to provide adequate functional sites for curing reactions, and the castor oil is added in amounts sufficient to impart a desired degree of pliability to the finished cured film. Thermosetting copolymers are formed from a major portion of the formed interpolymer, and a minor portion of an aminoplast thermosetting resin. The thermosetting copolymer with solvents leads to coating compositions.

---

This invention relates to novel copolymers, copolymer compositions and coating compositions containing the novel copolymers. It also relates to methods for making the copolymers and compositions.

Film forming copolymer compositions have been made of a monomer or a mixture of monomers which form hard polymers, and a functional vinyl monomer which is polymerizable with the hard monomer. The hard monomers can be so called because they are capable of forming hard polymers. Such hard monomers include styrene and other polymerizable vinyl monomers such as α-methyl styrene, acrylonitrile, vinyl toluene, lower aliphatic esters of methacrylic acid and the like. The functional vinyl monomer or mixture of functional vinyl monomers is selected from those polymerizable monomers containing functional hydroxyl or carboxyl groups such as hydroxyethyl acrylate, hydroxyethyl methacrylate, hydroxypropyl acrylate, hydroxypropyl methacrylate and other hydroxyalkyl copolymerizable monomers; and α,β-unsaturated carboxylic acids such as acrylic acid, methacrylic acid, itaconic acid, and the like. Such copolymer compositions are useful for making coatings compositions which further include a compatible thermosetting resin. Among other uses, these copolymer-thermosetting resin mixtures are useful as film formers in organic coating compositions such as paints, varnishes and the like.

In using such compositions there have been two major problems. The first problem has been that of controlling the level of hardness. Second, the utility of such resins has been limited, especially for coating compositions, because of low solubility in certain organic solvents widely used in the coating art. The problem of hardness level has been approached in different ways, one of which includes using external plasticizers for the formed copolymer. Such plasticizers have been added by a dilution step in which the plasticizer is dissolved in the finished copolymer, under moderate heat if necessary. The use of such plasticizers to control the hardness is often undesirable, because of problems of compatibility, physical migration, and, more importantly, the susceptibility of externally plasticized film to chemical and solvent attack.

Another method of adjusting the level of hardness of the copolymers, which is familiar to the art, is the inclusion into the copolymer of another polymerizable monomer, one which forms soft polymers such as ethyl acrylate or another aliphatic ester of acrylic acid. This method yields clear and soft copolymers, but requires the use of substantial quantities of plasticizing monomer, and since the plasticizing monomers are expensive, the coatings are useful only where relatively high costs are acceptable. The use of substantial quantities of plasticizing monomer also lowers the chemical and stain resistance of the final coating compositions.

It is accordingly an object of this invention to provide a copolymer composition and industrial coating composition which is economical to manufacture but which still meets the high performance requirements previously satisfied by higher cost compositions.

Another object is to provide new polymer compositions and a method for their preparation which leads to films which are desirably pliable and clear.

Another object is a copolymer composition and coating composition which has excellent properties but is produced at a sufficiently low cost to be used competitively in low cost applications such as toy finishes and the like.

Another important object is a composition and method which leads to a number of versatile, high performance coatings which can vary from very tough coatings of excellent chemical and stain resistance to softer and more flexible coatings useful in fields such as metal decorating, coil coating and the like.

Another object is copolymer compositions in which novel copolymers are improved by combining them with thermosetting resins to provide desirable film formers which are clear and tough, but not brittle.

Another object is a coating composition in which a new and improved copolymer is incorporated as an ingredient together with conventional solvents and pigments and thermosetting aminoplast resins.

Another object is to provide a coating composition in which the film forming ingredient includes an improved thermoplastic copolymer and a thermosetting resin to provide, after application and baking, a clear and tough but not brittle coating composition.

The foregoing objects are attained as well as other objects which will be evident from the ensuing specification wherein the invention is described in detail.

A new copolymer is prepared which can be used to make improved film forming compositions and coating compositions, by grafting a softening composition to the polymerizing mixture of hard monomer and functional vinyl monomers. This softening mixture should contain a major amount of glycerides of ricinoleic acid. A composition which very satisfactorily meets these requirements is raw castor oil, which is a triglyceride of mixed fatty acids. Of the fatty acids, about 89.9% is ricinoleic acid, about 4% linoleic acid, and about 3% oleic acid.

Reference will frequently be made to castor oil, but it should be understood that softening mixtures of compositions of the type disclosed are also intended to be included. In the process of preparing the improved copolymers, it is required that the steps of grafting the softening composition be executed during the copolymerization or interpolymerization of the hard monomer and the functional vinyl polymer. The softening composition, which is preferably raw castor oil, participates in the formation of the copolymer to form a new interpolymer or copolymer with desirable properties.

The new copolymers or interpolymers contain selected proportions of hard monomer, castor oil, and functional monomer. Levels of hard monomer above about 70% usually yield polymers too brittle to be useful, and are normally not advisable. Less than about 15% or more than about 45% of castor oil tends to respecitvely result in very brittle or very soft polymers. Less than about 4% and more than about 20% of the functional monomer is not recommended since amounts too small tend to result in a poorly curable polymer which shows poor toughness, solvent resistance and gloss. Amounts of functional monomer in excess of about 20% generally result in economic waste because a sufficient level of cure is obtained at lower levels.

The copolymer, after admixture with the thermosetting resin and proper stoving, is tough but not brittle and is free from objectionable incompatibility. The copolymer has the added advantage in that it can generally be dissolved in conventional aromatic hydrocarbon solvents used in the coating art.

The volatile aromatic solvents which are useful include xylol, toluol, and other higher boiling aromatics. Some copolymers which contain substantial amounts of acrylonitrile are polymerized to greater advantage in the presence of oxygenated solvents such as ketones, glycol ethers and the like. A distinct advantage of the new copolymers, however, is that they extend the range of solvents which can be used because they are highly soluble as a class, especially in the inexpensive aromatic solvents. Their relatively low viscosity also permits application of coatings having a high nonvolatile content, allowing one coat systems to be practical.

In the method of preparing the improved copolymer, certain steps are followed to obtain a product with desirable properties. The hard monomer and functional vinyl monomers are mixed in the presence of a solvent and conventional vinyl polymerization catalysts such as an organic peroxide. The amount of solvent used should be maintained at lower levels during the early steps of the process to obtain high levels of participation of the castor oil in the copolymerization, as evidenced by improved copolymer compatibility.

In general, a portion of the monomers which will ultimately be used is combined with the castor oil in an appropriate amount, together with small amounts of catalyst and a first portion of the solvent employed. The reaction mixture is heated to obtain an exothermic reaction which is controlled in conventional ways. When the exothermic reaction subsides, the balance of the monomer mixture, not used in the first step, is added and a second exothermic reaction results. When the second exothermic reaction subsides, catalyst is periodically added to the mixture until polymerization is substantially completed. In the final step, the balance or second portion of the solvent is added to bring the batch to the desired nonvolatile content.

The thermoplastic copolymers tend to be relatively low molecular weight resins and do not, as such, show desirable film forming properties.

The new copolymer is used in combination with a thermosetting resin mixture either in a clear coating composition or in a pigmented coating composition. Such a combination may be referred to for convenience as a thermosetting copolymer mixture while the copolymer without the thermosetting resin may be referred to for distinction as the thermoplastic copolymer. Both the thermoplastic copolymer and the thermosetting copolymer mixture are utilized in organic solvent solutions, and therefore are non-aqueous compositions.

The improved copolymer can be used to make thermosetting compositions by mixing a major portion of the novel copolymer with a minor portion of a compatible aminoplast thermosetting resin. The minor amount may be from about 5% to 40% by weight of the mixture which includes the thermoplastic copolymer. It has been found that a preferred range is from about 10 to 25%. By the term "aminoplast," reference is made to the well-known classes of the amino formaldehyde condensation products, namely, the urea formaldehydes, the melamine formaldehydes and the benzoguanamine formaldehydes. The thermoplastic copolymers are therefore cured with the aminoplast thermosetting resins to form the higher molecular weight, cross-linked resins.

The thermoplastic copolymers formed in the presence of the castor oil result in solutions of higher viscosity and form much clearer films than like resinous compositions which include castor oil added after the polymerization. It is therefore evident that the castor oil does not operate as an external plasticizer but participates in the polymerization to form copolymers with markedly different properties. The new copolymers formed with the castor oil added during the polymerization step have additional improved properties which include improved gloss, flexibility, and adhesion. These improved characteristics are recognized in the art as indicative of improved compatibility of the interpolymerized or copolymerized resin. When the castor oil is added as a plasticizer, that is, blended with a preformed copolymer of hard and functional monomer, incompatibility is marked, evidenced in many instances by a milky appearance of the resin film. Copolymers which have been prepared by interpolymerizing the castor oil, on the other hand, result in a film which is free from objectionable incompatibility.

The following examples are presented to illustrate and provide better understanding of the invention. Such examples should not be construed as an exclusive embodiment of the invention since other embodiments are possible within the teachings of the invention.

EXAMPLE 1

Thermoplastic copolymer

A castor oil interpolymer typical of this invention was prepared by charging into a two-liter flask equipped with an agitator, thermometer, inert gas inlet tube and reflux condenser, 225 gm. of castor oil, 115 gm. of styrene, 150 gm. of methyl methacrylate, 20 gm. of hydroxyethyl methacrylate, 10 gm. of methacrylic acid, and 375 gm. of SC150 solvent (a mixture of aromatic hydrocarbons having a kauri-butanol value of 90 and a distillation range of 367–412° F.). The catalyst, 6 gm. of benzoyl peroxide, was added to the mixture, and under a blanket of inert gas that mixture was heated until the reaction became exothermic, at about 90° C. The maximum temperature reached during the exothermic reaction was 125° C. After the exothermic reaction subsided (about 28 minutes), a mixture of 110 gm. of styrene, 100 gm. of methyl methacrylate, 20 gm. of hydroxyethyl methacrylate, 10 gm. of methacrylic acid, and 3 gm. of azo bis isobutyronitrile was added through the condenser at a rate sufficient to yield an addition time of about twenty-five minutes. Fifteen minutes after the monomer addition was completed, the temperature was 120° C. and the first increment of azo bis isobutyronitrile (1 gm.) was added. Four more 1 gm. increments were added at hourly intervals. The temperature was maintained at 110–120° C. After the addition of the final catalyst, solvent sufficient to bring the nonvolatile content to a theoretical 50% was added. The physical characteristics of the interpolymer thus produced are recorded below:

| | |
|---|---|
| Gardner-Holdt viscosity, seconds | 51.7 |
| Nonvolatile content, percent | 49.5 |
| Solvent, SC150-xylol | 75:25 |
| Gardner-Holdt color | 1 |
| AV/NV (acid value of nonvolatile content) | 16.5 |
| Appearance, bright and clear. | |

The viscosity was determined by the Gardner-Holdt bubble viscosimeter method which includes a series of tubes filled with standard viscosity mineral oils. A standard tube is filled with the test material and the rate of travel of the bubble from the bottom to the top of the tube is compared to that of a standard series of tubes at a controlled temperature of 25° C. The actual time is recorded which is required for the travel of the bubble from the bottom of the tube to the first deformation of the bubble when it approaches the top. This test is described in ASTM D154-58, Test for Varnishes, Procedures A and B. The Gardner-Holdt color determinations are made by comparing tubes filled with varnish to the 1953 Gardner-Holdt standards, either in a Hellige comparator or to a series of standard tubes. This standard test is described in ASTM D–155. The acid value is recorded as the number of mgm. of potassium hydroxide necessary to neutralize a one gram sample of the nonvolatile portion of the resin.

A 1 mil film, air dried, was glossy and had only a very slight bluish haze. The resin was blended 8:2 with Uformite MM–55, a butylated melamine formaldehyde resin. A 1 mil film was glossy and clear. When baked at 325° F. for ten minutes, the film had a Sward hardness of 40 and passed a bend over a ⅛ inch mandrel. The undisturbed integrity of the film over the bend illustrated that the film was sufficiently flexible.

EXAMPLE 2

Thermosetting copolymer mixture

In a two gallon reactor fitted with agitator, thermometer, and inert gas inlet tube, 645 gm. of castor oil, 2421 gm. of styrene, 172 gm. of hydroxyethyl methacrylate and 86 gm. of methacrylic acid were polymerized in SC150 solvent according to the method of Example 1. The reactor charge consisted of all of the oil, ½ of the mixed monomers, 1650 gm. of SC150 solvent and 26 gm. of benzoyl peroxide. The remaining monomers, containing 8 gm. of benzoyl peroxide, were added after the initial exothermic reaction subsided. Incremental catalyst additions were made to complete the conversion of monomer to polymer. When the polymerization was substantially completed, the batch was finished by adding 1650 gm. of a 1:1 SC150-xylol mixture.

EXAMPLE 3

Coating compositions

A paint was prepared from the product of Example 2 by putting 240 gm. of the copolymer, 60 gm. of Uformite MM–55, a butylated melamine formaldehyde resin, 190 gm. of rutile titanium dioxide, 375 gm. of Ottawa sand, and 75 gm. of SC150 into a quart paint can. The mixture was shaken vigorously by a mechanical paint conditioner for fifteen minutes. At the end of this time, 75 gm. of SC150 was added to the mixture and stirred in. The sand was allowed to settle for five minutes. About 525 gm. of highly fluid grind paste was poured off the sand and mixed with 120 gm. of the interpolymer and 30 gm. of the melamine resin. The mixture was stirred to finish the paint.

The finished paint had a viscosity of forty-nine seconds in a #4 Ford Cup, according to the method described in ASTM D1200–58, Viscosity of Paints, Varnishes and Lacquers. Films of the paint were applied to glass and tinplate panels using a 3 mil doctor blade. After a ten minute bake at 325° F., the panels exhibited a 60° gloss of 98%. (This method is described at ASTM D523.) After a forty minute bake at 325° F., the gloss and color of the panels were unchanged. The films showed a Sward hardness of 44 and a pencil hardness of 3H. In the pencil hardness test, a series of pencils of different hardness have a flattened tip of the lead exposed about ¼ inch. The lead is pushed against the film at about 45° at a pressure just short of breakage of the lead. The hardest pencil which will not mar the film is read as pencil hardness.

The following chemical resistances were obtained:

No change was apparent in the films after they were immersed in tall oil fatty acids for 24 hours; HCl for 72 hours; 335 hours in 1% Ivory soap; 335 hours in 1% NaOH; and 335 hours in 1% Tide (detergent).

No stains were produced after 24 hours contact with prepared mustard, wax crayon, India ink, coffee, or marking ink. The films passed twenty inch pounds reverse and front impact and a bend over an ⅛-inch mandrel.

A Gardner impact tester was used for the impact resistance test. A two pound weight was lifted a number of inches and allowed to fall causing a round-nosed steel impact rod to strike the panel with a corresponding number of inch-pounds of force. This force pushes the panel into an underlying well causing a deformation of the panel and film. The deformation is examined for visible cracking, then taped and the tape stripped off to determine if the film has lost adhesion. There was no cracking or loss of adhesion at twenty-inch pounds.

EXAMPLE 4

External plasticization of copolymer with castor oil

A copolymer of the overall composition as that given in Example 2 was prepared by replacing the castor oil in the charge with an equal weight of SC150 solvent and then following the same procedure for polymerization. After the polymerization was substantially complete, the castor oil and remaining solvents were added. The finished polymer and oil solution was hazy and had a viscosity of 15.8 seconds, Gardner-Holdt. Paint prepared from this solution according to the manner and formula of Example 2 yielded a gloss in the 85% range and reduced impact resistance and flexibility when compared to the paint of Example 2.

EXAMPLE 5

Copolymer composition with carboxyl functional monomer

A copolymer of 200 gm. of castor oil, 520 gm. of vinyl toluene, and 80 gm. of methacrylic acid was prepared in a 7:1 xylol-butanol solvent according to the method of Example 1. The finished resin was bright and clear with an acid number of 67, a G–H viscosity of X @ 50% NVM, and a color of less than 1. When mixed 8:2 with the butylated melamine resin and put into a paint according to the method and formula of Example 2, a paint of excellent gloss (95%) and hardness (49 Sward hardness) was produced.

The thermoplastic copolymer having the castor oil incorporated during the polymerization stage has many advantages, the principal one being its ability to provide improved coating compositions. Such a thermoplastic copolymer is rendered thermosetting for coating applications by combining it with an aminoplast thermosetting resin, preferably in an appropriate aromatic organic solvent of the type disclosed. The improved coating compositions can be prepared by combining the thermoplastic copolymer with a minor amount of aminoplast thermosetting resin and an effective amount of a colorant or pigment to impart a desired color in the coating composition. The mixture is put together in the presence of an effective amount of the appropriate aromatic organic solvent. Other steps well known in the coating processing art may be employed to effect the final coating composition.

The key is the preparation of the thermoplastic copolymer. It has been found that the preferred process includes addition to the oil of the mixed monomers and the solvent or solvents in sequential portions to attain both a controlled process and a good interpolymerization of the oil with the vinyl monomers. Thus, the first portion of the mixed monomers, including the hard monomer and the functional vinyl monomer, is combined with the first portion of the solvent and all of the oil. The respective amounts of monomer and solvent in this first step are determined by men skilled in this art by noting the level of monomer in the total composition. This first mixture has ingredients whose amounts are interrelated, and such quantitive interrelation is not critical but should be observed to control the reaction exotherm and the level of oil interpolymerization. This is readily determined by skilled practitioners in the art. If the ratio of the mixed monomers to the oil is great, as it will be when the resulting copolymer is intended to be hard, then correspondingly more solvent should be added to control the exothermic reaction under the conditions employed. By the term "conditions employed" is meant the capacity and properties of the reaction chamber and ancillary equipment together with the total volume of the reaction mixture and the reaction rate at which the polymerization is conducted. It is clear to those skilled in this art that an uncontrolled exothermic reaction, beyond the capacity of the equipment, would prevent the successful practice of the process. On the other hand, if a softer film is desired, the ratio of the mixed monomers to the oil will be smaller and a correspondingly smaller amount of solvent in this first portion will be required to control the exothermic reaction under the conditions employed. In a sense, the greater amount of oil or softening agent acts as a diluent to permit thereby reduction of the aromatic organic solvent in the first portion. If too much solvent is used in the first step, the participation of the oil is inhibited and copolymers of poor compatibility will result. The reaction is conducted until the initial exotherm subsides and then a second portion of mixed monomers is added. This reaction is conducted until polymerization is substantially completed, preferably by periodic additions of small but effective portions of vinyl polymerization catalysts which are well known to the art. A final portion of aromatic organic solvent is then added to bring the composition to a desired nonvolatile content, that is, the concentration of the film forming ingredients in the composition. Such a sequential addition of the solvent, in particular, permits the oil to be incorporated desirably into the copolymer.

The foregoing examples have illustrated how compositions can be made which lead to copolymers of improved properties, and to compositions especially useful in the coating art. The feature of clarity in the formed film is an advantage in many ways, one of which is the pleasing appearance of the clear film which highlights underlying features of an article which is coated. There is no incompatibility in the coating which would interfere or otherwise adversely affect the gloss which is intended to be developed by the coating composition. Various pigments well known in the coating art may be incorporated in the composition to attain any one of a number of desired colors.

The foregoing invention can now be practiced, and such practitioners will know that the invention is not necessarily restricted to the particular embodiments presented herein. The scope of the invention is to be defined by the terms of the following claims as given meaning by the preceding description.

We claim:
1. A method of preparing an interpolymer of castor oil, a functional monomer and a hard monomer by the steps of interpolymerizing castor oil with a mixture of monomers having a hard monomer of the class of α-methyl styrene, acrylonitrile, vinyl toluene, and lower aliphatic esters of methacrylic acid, and a functional monomer of the class of hydroxyloweralkyl acrylates, hydroxyloweralkyl methacrylates, acrylic acid and methacrylic acid.

2. A process as in claim 1 further characterized in that said castor oil is added in amounts of about 15% to about 40% by weight of the mixture.

3. A process as in claim 1 further characterized by and including the steps of reacting a major portion of the formed interpolymer with a minor portion of an aminoplast thermosetting resin to obtain a thermosetting interpolymer film.

4. A process as in claim 1 further characterized in that a first portion of an organic aromatic solvent is mixed with a first portion of mixed monomers which includes said hard monomer and said functional monomer, said functional monomer being present in an amount from about 4% to about 20% by weight of the formed interpolymer, interpolymerizing said mixture with castor oil in the presence of a small but effective amount of vinyl polymerization catalyst, said castor oil being present in an amount sufficient to attain a desired level of pliability in the finshed film and said first portion of solvent present in an amount sufficient so that said castor oil and mixed monomers undergo an initial exothermic reaction, allowing said initial exotherm to subside, then adding a second portion of the mixed monomers to provide a second exothermic reaction, continuing the interpolymerization to substantial completion by periodically adding small but effective amounts of vinyl polymerization catalysts, and then adding a second portion of the aromatic organic solvent to bring the composition to a desired nonvolatile content.

5. An interpolymer composition which includes a hard monomer of the class of α-methyl styrene, acrylonitrile, vinyl toluene, and lower aliphatic esters of methacrylic acid, and a functional monomer of the class consisting of hydroxyloweralkyl acrylates, hydroxyloweralkyl methacrylates, acrylic acid and methacrylic acid, and castor oil interpolymerized in the formed interpolymer in an amount sufficient to impart a desired degree of pliability to the formed interpolymer, said formed interpolymer having clarity and being substantially free from incompatability.

6. A composition as in claim 5 further characterized in that said functional monomer is present from about 4% to about 20% by weight of said interpolymer, said castor oil being interpolymerized in said formed interpolymer and being present in an amount sufficient to impart pliability to said interpolymer compostion, and a major amount of said interpolymer composition being mixed with a minor amount of an aminoplast thermosetting resin to obtain an interpolymer film forming composition.

7. A composition as in claim 6 further characterized in that said interpolymer film forming composition is in a coating composition which forms a hard but not brittle film, said coating composition further including a pigment in a sufficient amount to impart the desired color to the composition, and a solvent in an amount sufficient to maintain the composition fluid until after application.

References Cited

UNITED STATES PATENTS

| | | |
|---|---|---|
| 2,414,525 | 1/1947 | Hill et al. |
| 2,550,114 | 4/1951 | Foster. |
| 2,574,753 | 11/1951 | Opp et al. |
| 2,647,876 | 8/1953 | Evans et al. |
| 2,986,543 | 5/1961 | Daniel. |
| 3,068,183 | 12/1962 | Strolle _____ 260—21 |
| 3,030,321 | 4/1962 | Lombardi et al. _____ 260—23 |

HOSEA T. TAYLOR, Jr., Primary Examiner

R. W. GRIFFIN, Assistant Examiner

U.S. Cl. X.R.

117—124, 134, 167; 260—23, 33, 39, 41